United States Patent
Weber

Patent Number: 5,586,467
Date of Patent: Dec. 24, 1996

[54] IMPACT PROTECTED CAM DRIVE FREE OF BACKLASH

[75] Inventor: Uwe Weber, Aalen, Germany

[73] Assignee: Carl Zeiss Stiftung, Heidenheim-Brenz, Germany

[21] Appl. No.: 412,587

[22] Filed: Mar. 29, 1995

[30] Foreign Application Priority Data

Apr. 2, 1994 [DE] Germany ............ 44 11 516.4

[51] Int. Cl.⁶ ........................................ F16H 25/12
[52] U.S. Cl. ................ 74/57; 74/567; 74/569; 359/700
[58] Field of Search ............ 74/567, 569, 99 A, 74/57; 359/700, 704, 705, 823

[56] References Cited

U.S. PATENT DOCUMENTS

| | | |
|---|---|---|
| 4,272,160 | 6/1981 | Uesugi . |
| 4,322,151 | 3/1982 | Weiss . |
| 4,496,217 | 1/1985 | Aoyagi ................ 350/255 |
| 4,688,902 | 8/1987 | Gardam . |
| 4,834,033 | 5/1989 | Larsen ................ 74/57 X |

Primary Examiner—Vinh T. Luong
Assistant Examiner—David Fenstermacher
Attorney, Agent, or Firm—Walter Ottesen

[57] ABSTRACT

The invention is directed to a backlash-free cam drive which can be subjected to an impact load. The cam drive includes: a housing defining a longitudinal axis; a cam follower assembly mounted in the housing so as to be displaceable along the axis fixed against rotation about the axis; an adjusting member mounted on the housing so as to be rotatable about the axis and relative to the cam follower assembly; and, a cam formed in said adjusting member so as to define two mutually adjacent guide cams extending along a guide path. The cam follower assembly includes: a frame; first and second contact rollers mounted on the frame so as to be displaceable relative to each other; a spring for resiliently biasing the first and second contact rollers relative to each other and against corresponding ones of the guide cams whereby the cam follower assembly is displaced along the axis as the adjusting member is rotated; an ancillary part fixedly mounted to the frame to extend into the guide path between the guide cams but not touching the guide cams during normal operation of the cam drive in the absence of the impact load; the ancillary part including a shock absorber for contact engaging one of the guide cams in response to the impact load applied transversely to the guide cams; and, the adjusting member defining the guide cams being made of a first material and the shock absorber being made of a second material elastically softer than the first material.

8 Claims, 3 Drawing Sheets

5,586,467

IMPACT PROTECTED CAM DRIVE FREE OF BACKLASH

FIELD OF THE INVENTION

The invention relates to a backlash-free cam drive having a guide path with guide cams on respective sides and a cam follower assembly with two pressure contact rollers or cam followers which are pressed by spring action against respective guide cams.

BACKGROUND OF THE INVENTION

U.S. Pat. No. 4,322,151 discloses a cam drive of this kind.

U.S. Pat. No. 4,272,160 discloses the problem that impact will result in deformations of the cam surfaces in backlash-free cam drives. The backlash-free guiding function is assumed by elastic bodies or by spring loading. Additional pin/guide combinations are provided in the cam drive to accommodate impact loads and the deformation of these additional pin/guide combinations by the impact loads is deliberately accepted. The actual cam surface of the cam drive is thus protected if an impact load occurs in a preferred direction.

From U.S. Pat. No. 4,688,902, the axially displaced arrangement of two cam followers is known and which lie in close contact on the opposite sides of the guide path. A roller can be equipped with an elastic ring which produces the contact pressure acting against the second roller by elastic compression. No information is given as to the response in the event of impact.

SUMMARY OF THE INVENTION

Proceeding from the prior art, it is an object of the invention to provide a cam drive which affords protection against impact loads applied in all directions. It is also an object of the invention to provide such a cam drive which is suitable for heavy lens components and which can be easily machined and have low weight and therefore be suitable for guide cams made of relatively soft aluminum. The cam drive of the invention does not require additional guide cams and has a radially compact configuration.

The backlash-free cam drive of the invention, which can be subjected to an impact load, includes: a cam member having a guide path thereon; the guide path defining two mutually adjacent cam tracks; a cam follower unit including first and second contact rollers mounted thereon so as to be resiliently biased relative to each other and against corresponding ones of the cam tracks; and, an ancillary component mounted thereon so as to be in spaced relationship to the cam tracks in the absence of the impact load and contact engaging one of the cam tracks in response to the impact load on the cam drive; the cam member including a first material for defining the cam tracks and the ancillary component including a contact part for contact engaging the one cam track; and, the contact part being made of a second material elastically softer than the first material.

The pressure contact rollers are in line contact with the guide cams and interact during normal operation; whereas, when an impact load occurs, the additional part of the cam follower unit counters with a surface pressure accompanied by a progressively increasing surface area due to the elastic deformation of the elastically soft component of this additional part. A plastic deformation of the guide cam is thereby reliably precluded at least for shock accelerations which the overall structure of the cam drive or lens system can otherwise withstand.

BRIEF DESCRIPTION OF THE DRAWINGS

The invention will now be described with reference to the drawings wherein:

FIG. 3b is a section view taken along line IIIb—IIIb of FIG. 3a; and,

FIG. 3c is a section view taken along line IIIc—IIIc of FIG. 3a.

DESCRIPTION OF THE PREFERRED EMBODIMENTS OF THE INVENTION

Figure 1:
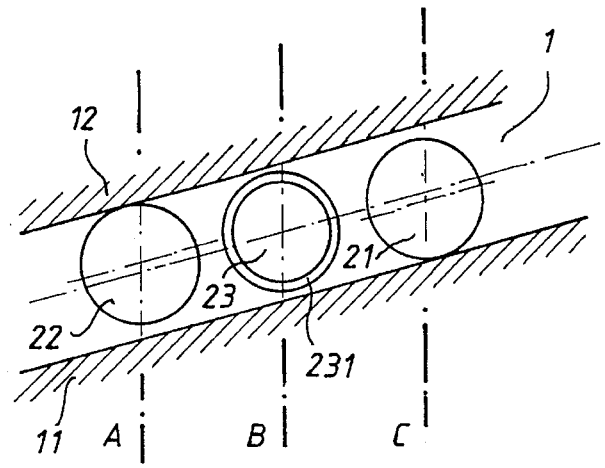
FIG. 1 shows a schematic plan view of the guide path and the pressure contact rollers and the additional elastically soft component of the cam drive.
Figure 2A:
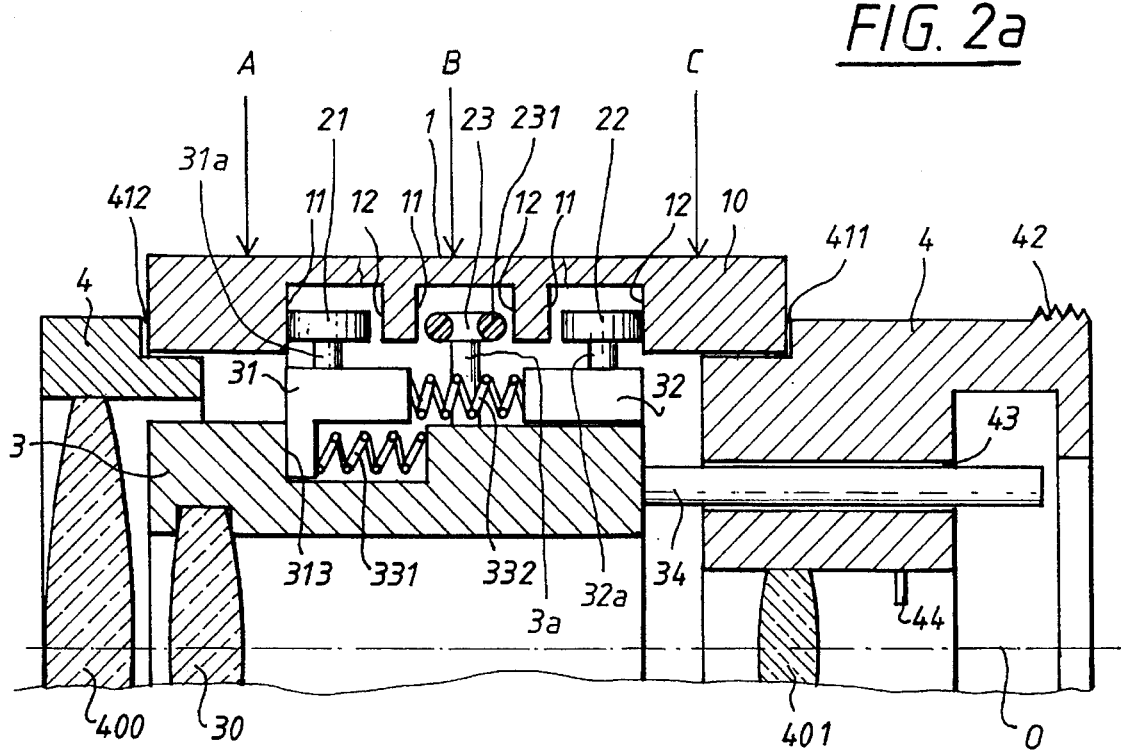
FIG. 2a shows a schematic illustration, in longitudinal section, of the cam drive in normal operation, built into an objective having several lenses.
Figure 2B:
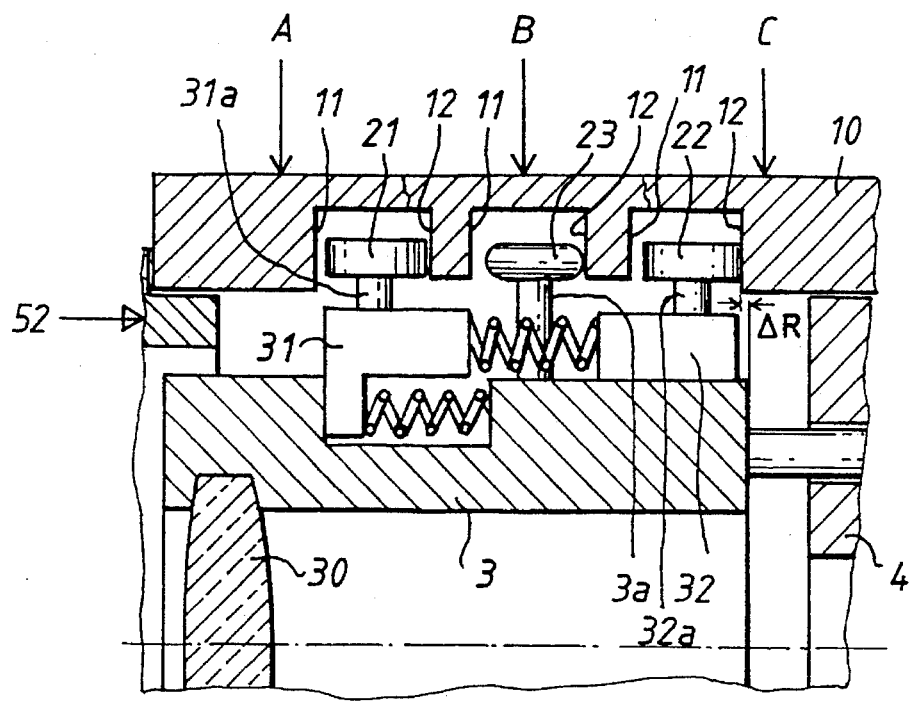
FIG. 2b shows the cam drive of FIG. 2a with an impact load applied from the left.
Figure 2C:
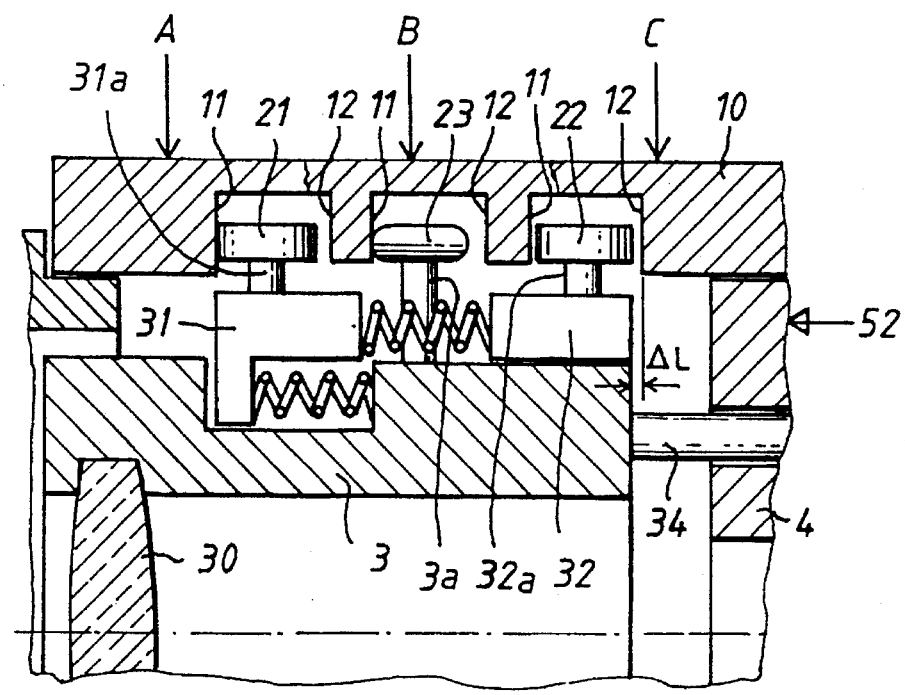
FIG. 2c shows the cam drive of FIG. 2a with an impact load applied from the right.

The plan view of FIG. 1 shows a detail of a guide path 1 with guide cams 11 and 12 on respective sides. Two pressure contact rollers (21, 22) in the form of roller bearings are mounted between the two guide cams (11, 12). In normal drive operation, pressure contact roller 21 is in contact engagement with guide cam 11 and this combination performs the drive movement along longitudinal axis 0. In a manner similar to that disclosed in U.S. Pat. No. 4,322,151, contact roller 22 is in contact engagement with the opposite guide cam 12 and is resiliently biased against pressure contact roller 21. Resilient biasing means for this purpose are known in the art in great variety and include springs of all forms including helical pressure springs 332 as shown in FIGS. 2a to 2c and fluid pressure systems or electromagnetic systems. In this way, the pressure contact roller 21 is guided without backlash on the guide cam 11. A pin or a ball bearing having a circumferential rubber ring 231 mounted thereon is provided as an additional component 23 between pressure contact rollers (21, 22). This additional component 23 does not normally come into contact with the two guide cams (11, 12).

FIG. 2a shows an objective equipped with a cam drive according to the invention. FIG. 2a is a schematic longitudinal section view with different section planes being combined for the purpose of illustration.

The housing 4 of the objective carries a front lens 400 and a rear lens 401, a diaphragm 44 and connecting means which, in this embodiment, is a thread 42 for threadable engagement with a camera or the like. A slide mount 3 with a lens 30 mounted therein is axially journalled in the housing 4 by means of a rod 34 and a matching bore 43 so as to be axially movable but fixed against rotational displacement about longitudinal axis 0. The component 23 having rubber ring 231 is rigidly connected to the slide mount 3 by shaft 3a. The leading pressure contact roller 21 is fixedly connected to an intermediate ring 31 by shaft 31a. This ring 31 is supported in the slide mount 3 so as to be axially movable and fixed against rotation. The intermediate ring 31 is axially delimited by a stop face 313 and the pretensioned pressure spring 331 as long as the pretensioning force of spring 331 is not exceeded by an impact force.

The second pressure contact roller 22 is mounted on a second intermediate ring 32 by shaft 32a. The intermediate ring 32 is also supported in the slide mount 3 so as to be axially movable and fixed against rotation. The guide cams (11, 12) limit the axial movement of the intermediate ring 32 because the intermediate ring is connected to the contact roller 22 by the shaft 32a.

The second intermediate ring 32 is axially braced against the first intermediate ring 31 by means of a pressure spring 332. This ensures that, in normal use without an impact load, pressure contact roller 21 always lies against guide cam 11 and, when the adjusting ring 10 is rotated, the contact roller 21 follows the contour of guide cam 11 to provide an axial displacement of the slide mount 3 without backlash. The stop face 313 and pressure spring 331 described above also ensure a backlash-free transfer to the slide mount 3.

Adjusting ring 10 is rotatably journalled in the housing 4 via axial-radial bearings (411, 412) and the guide path 1 is formed in the inner wall of ring 10 as a spiral channel defining the guide cams 11 and 12 as shown in FIG. 2a.

A cam drive in an objective lens system as described above permits the zoom or focus to be adjusted when the slide mount 3 with lens 30 is axially displaced along longitudinal axis 0.

FIG. 2b is a detail of FIG. 2a and shows how the cam drive responds when there is an impact load applied from the left as represented by arrow 52.

Due to its mass moment of inertia, slide mount 3 moves against the force of spring 332 to the right an amount ΔR, until component 23 makes contact with guide cam 12 with rubber ring 231 which deforms over a wide area thereby progressively developing increasing braking force with minimum pressure being applied to the guide cam 12. During this action, pressure contact roller 21 lifts off guide cam 11. During braking by rubber ring 231, intermediate ring 31 lifts off stop face 313, is decelerated by the compression of springs (331, 332) and, in extreme cases, roller 21 (which moves with intermediate ring 31 because it is fixedly mounted thereon by the shaft 31a) pushes against guide cam 12. However, as the mass of intermediate ring 31 is low compared to the entire slide mount 3, the load developed during the line contact of pressure contact roller 21 against guide cam 12 is unproblematic and no deformation occurs. The line contact between pressure contact roller 22 and guide cam 12 is likewise limited and harmless due to the parameters of spring 332. In practice, this overshoot of intermediate ring 31 does not occur if suitable dimensioning is chosen. This possibility can also be entirely precluded by including an appropriate stop or the like in the bearing configuration of intermediate ring 31.

FIG. 2c shows the same as FIG. 2b except that the impact load is applied from the right as represented by arrow 52.

In this case, slide mount 3 moves to the left a distance ΔL until component 23 with rubber ring 231 strikes guide cam 11 thereby providing a noncritical braking action as in the case described above with respect to FIG. 2a. The load along the line of contact between pressure contact roller 21 and guide cam 11 is only increased noncritically by the compression of spring 331. The relatively light intermediate ring 32 only moves farther to the left in response to extreme accelerations. If, for example, the inertial force (force produced by the accelerated weight of the slide mount) of slide mount 3 is 10N, of intermediate ring 32 is 1N and the spring force of spring 332 is 50N, then the slide mount will move to the left at an acceleration of 5 g (five times the acceleration due to gravity). However, for intermediate ring 32 to move to the left, 50 g are required. This would already be an extreme load on the entire objective lens system. Moreover, the movement of the intermediate ring can also be prevented by simple means such as by a stop, for example.

Figure 3A:
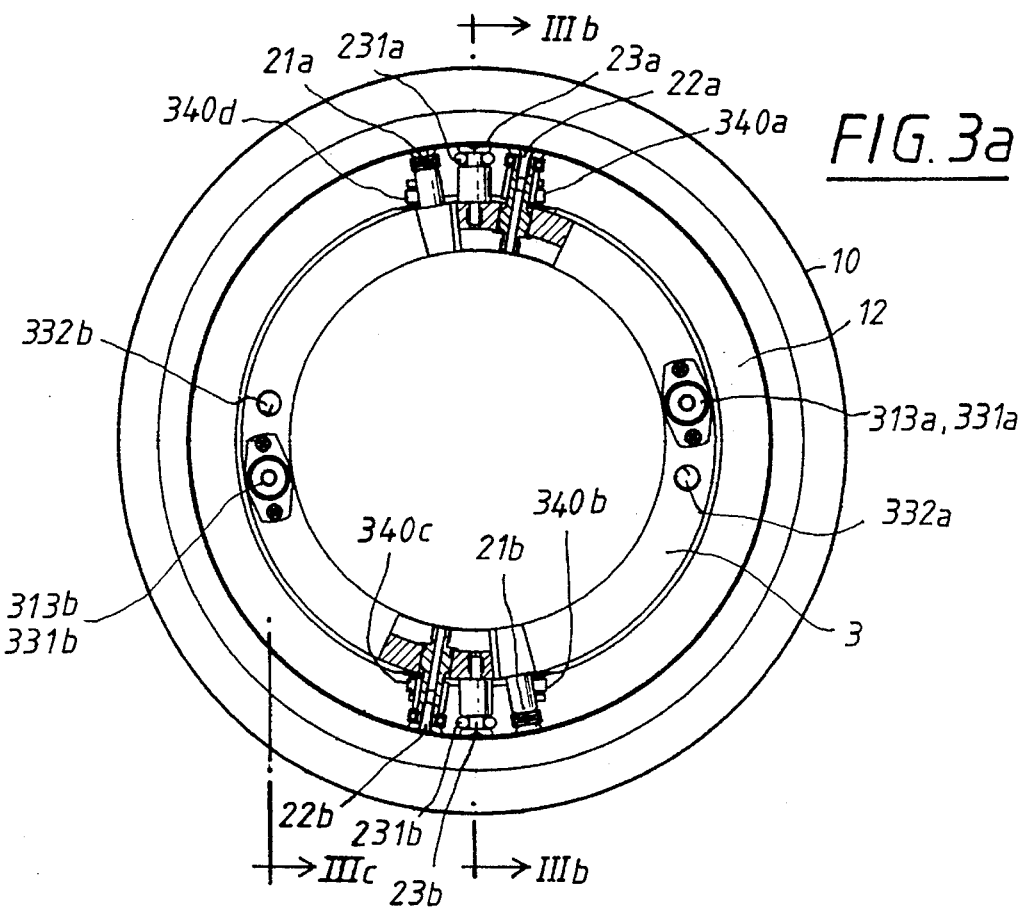
FIG. 3a shows, in an axial direction and partially in section, another embodiment of the cam drive of the invention suitable for an objective lens system with the cam drive being assembled from rings.
Figure 3B:
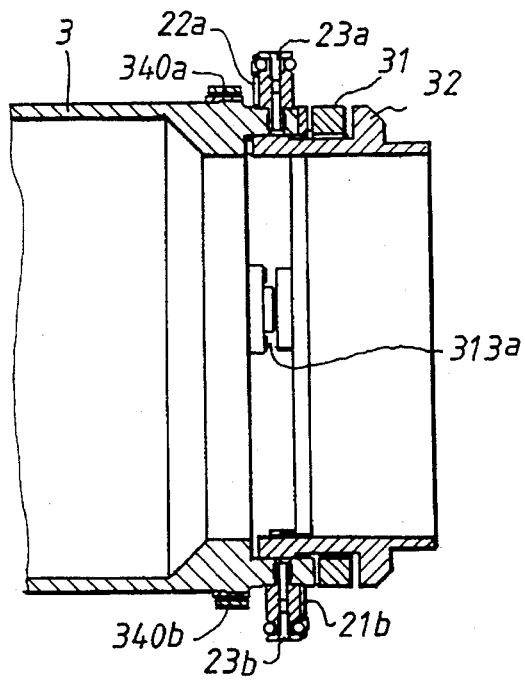
Figure 3C:
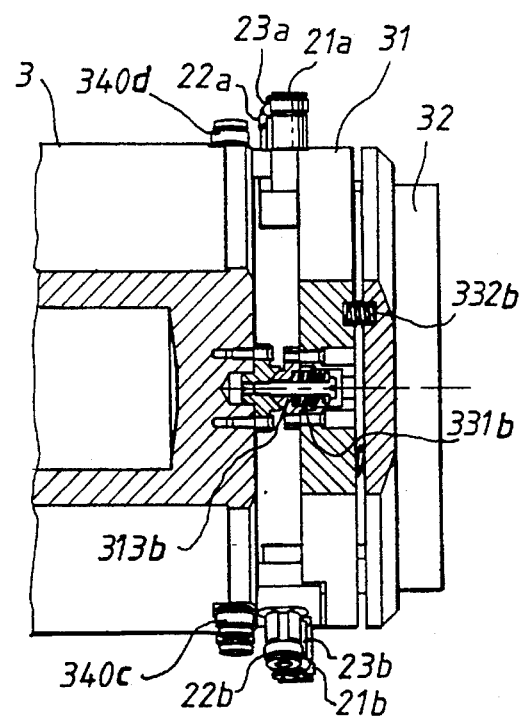

FIGS. 3a to 3c show the key elements of the configuration according to the invention for a specific embodiment. FIG. 3a shows a section view through guide path 1 as seen from left to right referred to FIG. 2a. FIG. 3a also shows the adjusting ring 10 with guide cam 12, slide mount 3 and the components thereon. Pressure contact rollers (21a, 21b; 22a, 22b) and pins (23a, 23b) with rubber rings (231a, 231b) each are provided twice and are arranged in diametrically opposed groups. Two spherical bearings (313a, 313b) are on lines lying transversely to these groups. These spherical bearings are an embodiment of stop face 313 described above and are mounted with pressure springs (331a, 331b) and two pressure springs (332a, 332b).

FIG. 3b shows slide mount 3 and pins (23a, 23b) fixedly attached thereto. The pins (23a, 23b) have respective rubber rings (231a, 231b). The intermediate rings (31, 32) are also shown in the section view of FIG. 3b and also shown in FIG. 3c. Here, the mutual support provided by spherical bearing 313a having pressure spring 331a and by pressure spring 332a are shown.

FIGS. 3a to 3c show that slide mount 3 and intermediate rings (31, 32) have suitable recesses and projections in the area of pressure contact rollers (21a, 21b; 22a, 22b) and pins (23a, 23b) with respective rubber rings (231a, 231b) to accommodate these components with the necessary freedom of movement.

The doubling of pressure contact rollers (21a, 21b; 22a, 22b), pins (23a, 23b), spherical bearings (313a, 313b) and pressure springs (331a, 331b; 332a, 332b) and the annular configuration of components (31, 32) increase the stability of the arrangement and the accuracy of the cam drive.

The components (340a, 340b, 340c, 340d) shown in FIGS. 3a to 3c are pressure contact rollers, which coact with the axial plane surfaces of the lens housing 4. These are used in lieu of the linear guidance provided by components (34, 43) of FIG. 2a which prevent rotation about the longitudinal axis 0. Other linear guides are known in the art and may be substituted for the shown guides.

It is understood that the foregoing description is that of the preferred embodiments of the invention and that various changes and modifications may be made thereto without departing from the spirit and scope of the invention as defined in the appended claims.

What is claimed is:

1. A backlash-free cam drive which can be subjected to an impact load, the cam drive comprising:

a cam member having a guide path thereon;

said guide path defining two mutually adjacent cam tracks;

a cam follower unit including first and second contact rollers mounted thereon so as to be resiliently biased relative to each other and against corresponding ones of said cam tracks; and, an ancillary component mounted thereon so as to be in spaced relationship to said cam tracks in the absence of said impact load and contact engaging one of said cam tracks in response to said impact load on said cam drive;

said cam member including a first material for defining said cam tracks and said ancillary component including a contact part for contact engaging said one cam track; and, said contact part being made of a second material elastically softer than said first material.

2. The backlash-free cam drive of to claim 1, said ancillary component being a roller incorporating said contact part.

3. The backlash-free cam drive of claim 1, said ancillary component being a pin incorporating said contact part.

4. The backlash-free cam drive of claim 1, said cam follower unit defining a longitudinal axis; and, said cam follower unit further comprising: a frame; first and second intermediate rings displaceably mounted on said frame for holding said first and second contact rollers, respectively; stop means for delimiting the movement of said first intermediate ring; resilient biasing means for resiliently biasing said first and second contact rollers relative to each other and against corresponding ones of said cam tracks whereby said cam follower unit is displaced along said axis as said cam member is rotated; said resilient biasing means being a first resilient biasing means resiliently biasing said first and second intermediate rings with respect to each other; and, second resilient biasing means for resiliently biasing said first intermediate ring relative to said frame.

5. The backlash-free cam drive of claim 4, further comprising: a housing; said housing holding a plurality of lenses defining an objective; and, said frame holding one of said lenses.

6. The backlash-free cam drive of claim 4, further comprising: two of said first contact rollers mounted on said first intermediate ring and two of said second contact rollers mounted on said second intermediate ring; two of said stop means for delimiting the movement of said first intermediate ring; two of said first resilient biasing means and two of said second resilient biasing means; said first contact rollers being mounted at diagonally opposite positions on said first intermediate ring; said second contact rollers being mounted on diagonally opposite positions on said second intermediate ring; said two stop means being mounted at diagonally opposite positions; said two first resilient biasing means being at diagonally opposite positions; and, said two second resilient biasing means being at diagonally opposite positions.

7. The backlash-free cam drive of claim 4, said ancillary component being fixedly attached to said frame; said frame having a first mass and said intermediate rings having a second mass less than said first mass; and, said first and second contact rollers having respective shafts rigidly connected to said first and second intermediate rings, respectively.

8. A backlash-free cam drive which can be subjected to an impact load, the cam drive comprising:

a housing defining a longitudinal axis;

a cam follower assembly mounted in said housing so as to be displaceable along said axis;

means for fixing said cam follower assembly against rotation about said axis;

an adjusting member mounted on said housing so as to be rotatable about said axis and relative to said cam follower assembly;

cam means formed on said adjusting member so as to define two mutually adjacent guide cams extending along a guide path; and, said cam follower assembly including: a frame; first and second contact rollers mounted on said frame so as to be displaceable relative to each other; resilient biasing means for resiliently biasing said first and second contact rollers relative to each other and against corresponding ones of said guide cams whereby said cam follower assembly is displaced along said axis as said adjusting member is rotated; an ancillary part fixedly mounted to said frame to extend into said guide path between said guide cams but not touching said guide cams during normal operation of said cam drive in the absence of said impact load; said ancillary part including shock absorbing means for contact engaging one of said guide cams in response to said impact load applied transversely to said guide cams; and, said adjusting member defining said guide cams being made of a first material and said shock absorbing means being made of a second material elastically softer than said first material.

* * * * *